(12) United States Patent
Hamakubo et al.

(10) Patent No.: US 11,820,704 B2
(45) Date of Patent: Nov. 21, 2023

(54) RESIN COMPOSITION, SECONDARY COATING MATERIAL FOR OPTICAL FIBER, OPTICAL FIBER, AND METHOD FOR PRODUCING OPTICAL FIBER

(71) Applicant: SUMITOMO ELECTRIC INDUSTRIES, LTD., Osaka (JP)

(72) Inventors: Katsushi Hamakubo, Osaka (JP); Chiaki Tokuda, Osaka (JP); Noriaki Iwaguchi, Osaka (JP); Kazuya Tokuda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 434 days.

(21) Appl. No.: 17/278,766

(22) PCT Filed: Jun. 4, 2020

(86) PCT No.: PCT/JP2020/022125
§ 371 (c)(1),
(2) Date: Mar. 23, 2021

(87) PCT Pub. No.: WO2020/255734
PCT Pub. Date: Dec. 24, 2020

(65) Prior Publication Data
US 2022/0041500 A1 Feb. 10, 2022

(30) Foreign Application Priority Data
Jun. 19, 2019 (JP) .................................. 2019-113482

(51) Int. Cl.
*C03C 25/10* (2018.01)
*C03C 25/1065* (2018.01)
(Continued)

(52) U.S. Cl.
CPC ........ *C03C 25/1065* (2013.01); *C03C 25/285* (2013.01); *C03C 25/326* (2013.01);
(Continued)

(58) Field of Classification Search
CPC . G02B 6/02395; C03C 25/1065; C03C 25/47; C03C 25/285; C03C 25/326;
(Continued)

(56) References Cited

U.S. PATENT DOCUMENTS

2012/0321265 A1* 12/2012 Terruzzi ............. G02B 6/02395
385/128

FOREIGN PATENT DOCUMENTS

| JP | 61217011 A | * | 9/1986 |
| JP | S61-217011 A | | 9/1986 |
| JP | 2014-219550 A | | 11/2014 |

OTHER PUBLICATIONS

Peerapan Dittanet et al, "Effect of bimodal particle size distributions on the toughening mechanisms in silica nanoparticle filled epoxy resin," Polymer, Elsevier, vol. 54, No. 7, Jan. 21, 2013, p. 1832-p. 1845, XP028990617.

* cited by examiner

*Primary Examiner* — Jerry M Blevins
(74) *Attorney, Agent, or Firm* — Faegre Drinker Biddle & Reath LLP

(57) ABSTRACT

The present disclosure relates to a resin composition for coating an optical fiber, the resin composition including: a base resin that contains an oligomer, a monomer, and a photopolymerization initiator; and inorganic oxide particles, in which the inorganic oxide particles include a plurality of particle groups having different volume average particle sizes, and the volume average particle size is measured by small-angle X-ray scattering.

6 Claims, 1 Drawing Sheet

(51) Int. Cl.
*C03C 25/47* (2018.01)
*C03C 25/285* (2018.01)
*C03C 25/326* (2018.01)
*C08G 18/12* (2006.01)
*C08G 18/32* (2006.01)
*C08G 18/34* (2006.01)
*C08G 18/76* (2006.01)
*C08K 3/22* (2006.01)
*C09D 175/14* (2006.01)
*G02B 6/02* (2006.01)

(52) U.S. Cl.
CPC .............. *C03C 25/47* (2018.01); *C08G 18/12* (2013.01); *C08G 18/3206* (2013.01); *C08G 18/341* (2013.01); *C08G 18/348* (2013.01); *C08G 18/7621* (2013.01); *C08K 3/22* (2013.01); *C09D 175/14* (2013.01); *G02B 6/02395* (2013.01); *C08K 2003/2227* (2013.01)

(58) Field of Classification Search
CPC .. C08G 18/12; C08G 18/3206; C08G 18/341; C08G 18/348; C08G 18/7621; C08K 3/22; C08K 2003/2227; C09D 175/14
USPC ........................................................ 385/123
See application file for complete search history.

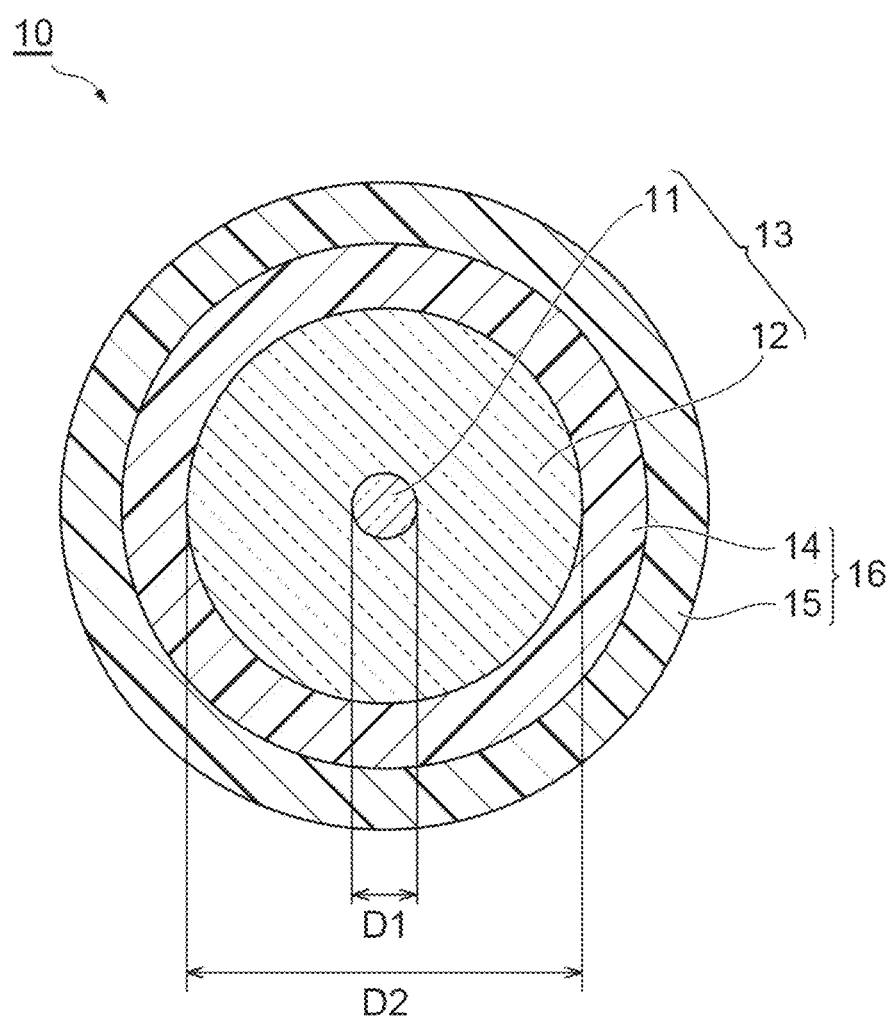

… (1)

RESIN COMPOSITION, SECONDARY COATING MATERIAL FOR OPTICAL FIBER, OPTICAL FIBER, AND METHOD FOR PRODUCING OPTICAL FIBER

TECHNICAL FIELD

The present disclosure relates to a resin composition, a secondary coating material for an optical fiber, an optical fiber, and a method for producing an optical fiber. The present application claims priority based on Japanese Patent Application No. 2019-113482 filed on Jun. 19, 2019, and incorporates all the contents described in the Japanese application.

BACKGROUND ART

Generally, an optical fiber includes a coating resin layer for protecting a glass fiber serving as an optical transmitter. The coating resin layer usually has a primary resin layer and a secondary resin layer.

An optical fiber is required to have excellent lateral pressure characteristics in order to reduce an increase in transmission loss induced by a slight bending generated when a lateral pressure is applied to the optical fiber. For example, Patent Literature 1 examined improvement of lateral pressure characteristics of an optical fiber by forming a secondary resin layer using an ultraviolet curable resin composition containing a filler made of synthetic quartz as a raw material.

CITATION LIST

Patent Literature

[Patent Literature 1] Japanese Unexamined Patent Publication No. 2014-219550

SUMMARY OF INVENTION

A resin composition according to one aspect of the present disclosure is a resin composition for coating an optical fiber, the resin composition including: a base resin that contains an oligomer, a monomer, and a photopolymerization initiator; and inorganic oxide particles, in which the inorganic oxide particles include a plurality of particle groups having different volume average particle sizes, and the volume average particle size is measured by small-angle X-ray scattering.

BRIEF DESCRIPTION OF DRAWINGS

FIG. 1 is a schematic cross-sectional view showing an example of an optical fiber according to the present embodiment.

DESCRIPTION OF EMBODIMENTS

Problems to be Solved by Present Disclosure

Introduction of a filler into a resin composition is a cause of deteriorating application properties of the resin composition.

An object of the present disclosure is to provide a resin composition which can realize excellent lateral pressure characteristics required for a secondary resin layer while still having excellent application properties.

Effects of Present Disclosure

According to the present disclosure, it is possible to provide a resin composition which can realize excellent lateral pressure characteristics required for a secondary resin layer while still having excellent application properties.

DESCRIPTION OF EMBODIMENTS OF PRESENT DISCLOSURE

First, contents of embodiments of the present disclosure will be listed and described. A resin composition according to one aspect of the present disclosure is a resin composition for coating an optical fiber, the resin composition including: a base resin that contains an oligomer, a monomer, and a photopolymerization initiator; and inorganic oxide particles, in which the inorganic oxide particles include a plurality of particle groups having different volume average particle sizes, and the volume average particle size is measured by small-angle X-ray scattering. The resin composition can be suitably used as an ultraviolet curable resin composition for coating an optical fiber.

By using the plurality of particle groups having different volume average particle sizes as the inorganic oxide particles, it is possible to provide a resin composition which can realize excellent lateral pressure characteristics required for a secondary resin layer while still having excellent application properties. In addition, oil resistance of an optical fiber to be obtained is improved.

In one aspect, the inorganic oxide particles may be particles containing at least one selected from the group consisting of silicon dioxide, zirconium dioxide, aluminum oxide, magnesium oxide, titanium oxide, tin oxide, and zinc oxide. These particles have excellent dispersibility in the resin composition, and therefore a Young's modulus is easily adjusted.

In one aspect, the inorganic oxide particles may be hydrophobic. Inorganic oxide particles into which a hydrophobic group has been introduced have excellent dispersibility in the resin composition.

In one aspect, the inorganic oxide particles may include at least two selected from the group consisting of a particle group A in which a volume average particle size is equal to or more than 5 nm and equal to or less than 35 nm, a particle group B in which a volume average particle size is more than 35 nm and equal to or less than 70 nm, and a particle group C in which a volume average particle size is more than 70 nm and equal to or less than 150 nm. Accordingly, it is easy to realize excellent lateral pressure characteristics required for a secondary resin layer, and furthermore, it is possible to obtain a resin composition having more excellent application properties.

A secondary coating material for an optical fiber according to one aspect of the present disclosure includes the above-mentioned resin composition. It is possible to obtain an optical fiber having excellent lateral pressure characteristics by forming a secondary resin layer using the above-mentioned resin composition.

An optical fiber according to one aspect of the present disclosure includes a glass fiber that has a core and a clad; a primary resin layer that is in contact with the glass fiber to coat the glass fiber; and a secondary resin layer that coats the primary resin layer, in which the secondary resin layer is formed of a cured product of the above-mentioned resin composition. Such an optical fiber has excellent lateral pressure characteristics.

An optical fiber according to one aspect of the present disclosure is an optical fiber including a glass fiber that has a core and a clad; a primary resin layer that is in contact with the glass fiber to coat the glass fiber; and a secondary resin layer that coats the primary resin layer, in which the secondary resin layer contains inorganic oxide particles, the inorganic oxide particles include a plurality of particle groups having different volume average particle sizes, and the volume average particle size is measured by small-angle X-ray scattering. Such an optical fiber has excellent lateral pressure characteristics.

A method for producing an optical fiber according to one aspect of the present disclosure includes an application step of applying the above-mentioned resin composition onto an outer circumference of a glass fiber composed of a core and a clad; and a curing step of curing the resin composition by irradiation with ultraviolet rays after the application step. Accordingly, it is possible to produce an optical fiber having excellent lateral pressure characteristics.

DETAILS OF EMBODIMENTS OF PRESENT DISCLOSURE

Specific examples of the resin composition and the optical fiber according to the embodiments of the present disclosure will be described with reference to drawings as necessary. The present disclosure is not limited to these examples, but is indicated by the scope of claims and is intended to include all modifications within the same meaning and scope as the scope of claims. In the following description, the same elements will be designated by the same reference numerals in the description of the drawings, and duplicate description will be omitted.

<Resin Composition>

The resin composition according to the present embodiment includes a base resin that contains an oligomer, a monomer, and a photopolymerization initiator; and inorganic oxide particles.

(Inorganic Oxide Particles)

The inorganic oxide particles are not particularly limited, but from the viewpoint of excellent dispersibility in the resin composition and allowing easy adjustment of the Young's modulus, they are preferably particles containing at least one selected from the group consisting of silicon dioxide (silica), zirconium dioxide (zirconia), aluminum oxide (alumina), magnesium oxide (magnesia), titanium oxide (titania), tin oxide, and zinc oxide. It is more preferable to use silica particles as the inorganic oxide particles according to the present embodiment from the viewpoints of low cost, easy surface treatment, easiness of imparting appropriate hardness to a resin layer having ultraviolet transmission properties, and the like.

The inorganic oxide particles are preferably hydrophobic. Specifically, it is preferable that a surface of the inorganic oxide particles be subjected to a hydrophobic treatment with a silane compound. The hydrophobic treatment means introducing a hydrophobic group into the surface of the inorganic oxide particles. Inorganic oxide particles into which a hydrophobic group has been introduced have excellent dispersibility in the resin composition. As the hydrophobic group, an ultraviolet curable reactive group such as a (meth) acryloyl group and a vinyl group, or a non-reactive group such as a hydrocarbon group (for example, an alkyl group) and an aryl group (for example, a phenyl group) may be used. In a case where the inorganic oxide particles have a reactive group, it is easy to form a resin layer having a high Young's modulus.

Examples of silane compounds having a reactive group include silane compounds such as 3-methacryloxypropyltrimethoxysilane, 3-acryloxypropyltrimethoxysilane, 3-methacryloxypropyltriethoxysilane, 3-acryloxypropyltriethoxysilane, 8-methacryloxyoctyltrimethoxysilane, 8-acryloxyoctyltrimethoxysilane, 7-octenyltrimethoxysilane, vinyltrimethoxysilane, and vinyltriethoxysilane.

Examples of silane compounds having an alkyl group include methyltrimethoxysilane, dimethyldimethoxysilane, ethyltrimethoxysilane, propyltrimethoxysilane, butyltrimethoxysilane, pentyltrimethoxysilane, hexyltrimethoxysilane, octyltrimethoxysilane, methyltriethoxysilane, dimethyldiethoxysilane, ethyltriethoxysilane, propyltriethoxysilane, butyltriethoxysilane, pentyltriethoxysilane, hexyltriethoxysilane, and octyltriethoxysilane.

The inorganic oxide particles may be dispersed in a dispersion medium when added to the resin composition. By using the inorganic oxide particles dispersed in the dispersion medium, the inorganic oxide particles can be uniformly dispersed in the resin composition, and storage stability of the resin composition can be improved. The dispersion medium is not particularly limited as long as it does not hinder curing of the resin composition. The dispersion medium may be reactive or non-reactive.

As the reactive dispersion medium, a monomer such as a (meth)acryloyl compound or an epoxy compound may be used. Examples of (meth)acryloyl compounds include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, polytetramethylene glycol di(meth) acrylate, 2-hydroxy-3-phenoxypropyl acrylate, a (meth) acrylic acid adduct of propylene glycol diglycidyl ether, a (meth)acrylic acid adduct of tripropylene glycol diglycidyl ether, and a (meth)acrylic acid adduct of glycerin diglycidyl ether. As the dispersion medium, a (meth)acryloyl compound exemplified for a monomer to be described later may be used.

As the non-reactive dispersion medium, a ketone solvent such as methyl ethyl ketone (MEK) or methyl isobutyl ketone (MIBK), an alcohol solvent such as methanol (MeOH) or propylene glycol monomethyl ether (PGME), or an ester solvent such as propylene glycol monomethyl ether acetate (PGMEA) may be used. In the case of the non-reactive dispersion medium, the resin composition may be prepared by mixing the base resin and the inorganic oxide particles dispersed in the dispersion medium, and then removing a part of the dispersion medium.

The inorganic oxide particles include a plurality of particle groups having different volume average particle sizes. It is possible to realize excellent lateral pressure characteristics and oil resistance after curing while still maintaining excellent application properties, as compared with a resin composition containing one kind of particle group having a single volume average particle size. The inorganic oxide particles may contain two kinds of particle groups having different volume average particle sizes, or may contain three kinds of particle groups. However, the number of kinds of particle groups is equal to or less than four from the viewpoint that then, effects of incorporating a plurality of particle groups become saturated and a producing method is simplified. A volume average particle size of particles contained in each of the particle groups is measured by analyzing the resin composition by a small-angle X-ray scattering method.

The inorganic oxide particles may include at least two selected from the group consisting of a particle group A in which a volume average particle size is equal to or more than 5 nm and equal to or less than 35 nm, a particle group B in which a volume average particle size is more than 35 nm and equal to or less than 70 nm, and a particle group C in which a volume average particle size is more than 70 nm and equal to or less than 150 nm. Accordingly, it is easier to achieve excellent lateral pressure characteristics after curing while still maintaining excellent application properties. From this viewpoint, a volume average particle size of the particle group A may be equal to or more than 10 nm and equal to or less than 35 nm or may be equal to or more than 10 nm and equal to or less than 30 nm, a volume average particle size of the particle group B may be more than 35 nm and equal to or less than 60 nm or may be equal to or more than 40 nm and equal to or less than 60 nm, and a volume average particle size of the particle group C may be equal to or more than 80 nm and equal to or less than 150 nm or may be equal to or more than 80 nm and equal to or less than 140 nm.

From the viewpoint that the effect of incorporating the plurality of particle groups having different volume average particle sizes can be easily obtained, a proportion of each of the particle groups may be at least equal to or more than 5 mass % or may be equal to or more than 10 mass % with a total mass of the inorganic oxide particles as a reference.

A volume average particle size of the inorganic oxide particles in the resin composition can be changed by adjusting an average particle size of the inorganic oxide particles used as raw materials, a particle size distribution of the particle size, and a surface state of the inorganic oxide particles (an amount of hydroxyl groups on the surface, the type of functional group, and the like).

The small-angle X-ray scattering method is a method of quantitatively determining a shape, distribution, and the like of a scattering substance by analyzing an X-ray scattering intensity obtained at a scattering angle equal to or less than 5°. A volume average particle size can be obtained from the X-ray scattering intensity profile. That is, a volume average particle size can be obtained by performing fitting by a non-linear least squares method so that a measured X-ray scattering intensity approximates to an X-ray scattering intensity calculated from a theoretical formula shown by a function of the particle size and the particle size distribution.

Analyzing such an X-ray scattering intensity profile to obtain a particle size distribution of a minute scattering substance is known, and as an analysis method, it is possible to use, for example, a known analysis method of Schmidt et al., for example, a method described in I. S. Fedorova and P. Schmidt: J. Appl. Cryst. 11, 405, 1978.

A content of the inorganic oxide particles is preferably equal to or more than 5 mass % and equal to or less than 60 mass % with a total amount of an oligomer, a monomer, and the inorganic oxide particles as a reference, but the content may be equal to or more than 5 mass % and equal to or less than 50 mass %, or may be equal to or more than 10 mass % and equal to or less than 40 mass %. When a content of the inorganic oxide particles is equal to or more than 5 mass %, it is easy to form a resin layer having excellent lateral pressure characteristics (excellent Young's modulus). When a content of the inorganic oxide particles is equal to or less than 60 mass %, application properties of the resin composition can be easily improved, and thereby a tough resin layer can be formed.

(Base Resin)

The base resin according to the present embodiment contains an oligomer, a monomer, and a photopolymerization initiator.

As the oligomer, it is preferable to include a urethane (meth)acrylate oligomer. As the urethane (meth)acrylate oligomer, it is possible to use an oligomer obtained by reacting a polyol compound, a polyisocyanate compound, and a hydroxyl group-containing (meth)acrylate compound. The (meth)acrylate means an acrylate or a methacrylate corresponding thereto. The same applies to (meth)acrylic acid.

Examples of polyol compounds include polytetramethylene glycol, polypropylene glycol, and bisphenol A-ethylene oxide adduct diols. Examples of polyisocyanate compounds include 2,4-tolylene diisocyanate, 2,6-tolylene diisocyanate, isophorone diisocyanate, and dicyclohexylmethane 4,4'-diisocyanate. Examples of hydroxyl group-containing (meth) acrylate compounds include 2-hydroxyethyl (meth)acrylate, 2-hydroxybutyl (meth)acrylate, 1,6-hexanediol mono(meth) acrylate, pentaerythritol tri(meth)acrylate, 2-hydroxypropyl (meth)acrylate, and tripropylene glycol di(meth)acrylate.

A number average molecular weight (Mn) of the polyol compound may be equal to or more than 300 and equal to or less than 3,000 from the viewpoint of adjusting a Young's modulus of the resin layer.

An organotin compound is generally used as a catalyst for synthesizing the urethane (meth)acrylate oligomer. Examples of organotin compounds include dibutyltin dilaurate, dibutyltin diacetate, dibutyltin malate, dibutyltin bis(2-ethylhexyl mercaptoacetate), dibutyltin bis(isooctyl mercaptoacetate), and dibutyltin oxide. It is preferable to use dibutyltin dilaurate or dibutyltin diacetate as the catalyst from the viewpoint of easy availability or catalytic performance.

A lower alcohol having 5 or less carbon atoms may be used when synthesizing the urethane (meth)acrylate oligomer. Examples of lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

The oligomers may include an epoxy (meth)acrylate oligomer. As the epoxy (meth)acrylate oligomer, it is possible to use an oligomer obtained by reacting an epoxy resin having two or more glycidyl groups with a compound having a (meth)acryloyl group.

As the monomer, it is possible to use a monofunctional monomer having one polymerizable group or a polyfunctional monomer having two or more polymerizable groups. Two or more kinds of monomers may be mixed and used.

Examples of monofunctional monomers include (meth) acrylate-based monomers such as methyl (meth)acrylate, ethyl (meth)acrylate, propyl (meth)acrylate, n-butyl (meth) acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth) acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butyl-cyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth) acrylate, nonylphenol EO-modified acrylate, nonylphenoxy polyethylene glycol (meth)acrylate, and isobornyl (meth) acrylate; carboxylic group-containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocyclic ring-containing (meth)acrylates such as N-acryloyl morpholine, N-vinylpyrrolidone, N-vinyl caprolactam, N-acryloyl piperidine, N-methacryloyl piperidine, N-acryloyl pyrrolidine, 3-(3-pyridine)propyl (meth)acrylate, and cyclic trimethylolpropane formal acrylate; maleimide-based monomers such as maleimide, N-cyclohexylmaleimide, and N-phenylmaleimide; N-substituted amide-based monomers such as (meth)acrylamide, N,N-dimethyl (meth)acrylamide, N,N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide, and N-methylolpropane (meth)acrylamide; aminoalkyl (meth)acrylate-based monomers such as aminoethyl (meth)acrylate, aminopropyl (meth)acrylate, N,N-dimethylaminoethyl (meth)acrylate, and tert-butylaminoethyl (meth)acrylate; and succinimide-based monomers such as N-(meth)acryloyloxymethylene succinimide, N-(meth)acryloyl-6-oxyhexamethylene succinimide, and N-(meth)acryloyl-8-oxyoctamethylene succinimide.

Examples of polyfunctional monomers include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylates of alkylene oxides adducts of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosandiol di(meth)acrylate, isopentyldiol di(meth)acrylate, 3-ethyl-1,8-octanediol di(meth)acrylate, EO adducts of bisphenol A di(meth)acrylate, trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxypolypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl] isocyanurate.

As the photopolymerization initiator, it is possible to appropriately select and use a photopolymerization initiator from known radical photopolymerization initiators. Examples of photopolymerization initiators include 1-hydroxycyclohexylphenyl ketone (Omnirad 184, manufactured by IGM Resins), 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907, manufactured by IGM Resins), 2,4,6-trimethylbenzoyldiphenylphosphine oxide (Omnirad TPO, manufactured by IGM Resins), and bis(2,4,6-trimethylbenzoyl)phenylphosphine oxide (Omnirad 819, manufactured by IGM Resins).

The resin composition may further contain a silane coupling agent, a leveling agent, an anti-foaming agent, an antioxidant, a sensitizer, and the like.

The silane coupling agent is not particularly limited as long as it does not hinder curing of the resin composition. Examples of silane coupling agents include tetramethyl silicate, tetraethyl silicate, mercaptopropyltrimethoxysilane, vinyltrichloro silane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl] disulfide, γ-trimethoxysilylpropyl dimethylthiocarbamyltetrasulfide, and γ-trimethoxysilylpropyl benzothiazil tetrasulfide.

A viscosity of the resin composition is preferably equal to or more than 300 mPa·s and equal to or less than 3,500 mPa·s at 45° C., is more preferably equal to or more than 300 mPa·s and equal to or less than 2,500 mPa·s at 45° C., and is even more preferably equal to or more than 300 mPa·s and equal to or less than 2,000 mPa·s at 45° C. When a viscosity of the resin composition is excessively high, application properties deteriorate, a coating diameter when forming a resin layer is not stable, and an optical fiber is easily broken. On the other hand, when a viscosity of the resin composition is excessively low, a self-aligning force is unlikely to work, and an uneven thickness tends to be generated.

The resin composition can be suitably used as a secondary coating material for an optical fiber. By using the resin composition according to the present embodiment for a secondary resin layer, it is possible to produce an optical fiber having excellent lateral pressure characteristics.

<Optical Fiber>

FIG. 1 is a schematic cross-sectional view showing an example of an optical fiber according to the present embodiment. An optical fiber 10 includes a glass fiber 13 having a core 11 and a clad 12, and a coating resin layer 16 having a primary resin layer 14 provided on an outer circumference of the glass fiber 13, and having a secondary resin layer 15. In the optical fiber 10, the secondary resin layer 15 is made of a cured product of the above-described resin composition.

The clad 12 surrounds the core 11. The core 11 and the clad 12 mainly contain glass such as quartz glass. For example, it is possible to use quartz glass to which germanium has been added or pure quartz glass for the core 11, and it is possible to use pure quartz glass or quartz glass to which fluorine has been added for the clad 12.

In FIG. 1, for example, an outer diameter (D2) of the glass fiber 13 is about equal to or more than 100 μm and equal to or less than 125 μm, and a diameter (D1) of the core 11 constituting the glass fiber 13 is about equal to or more than 7 μm and equal to or less than 15 μm. A thickness of the coating resin layer 16 is generally about equal to or more than 22 μm and equal to or less than 70 μm. A thickness of each of the primary resin layer 14 and the secondary resin layer 15 may be about equal to or more than 5 μm and equal to or less than 50 μm.

When the outer diameter (D2) of the glass fiber 13 is about 125 μm and the thickness of the coating resin layer 16 is equal to or more than 60 μm and equal to or less than 70 μm, the thickness of each of the primary resin layer 14 and the secondary resin layer 15 may be about equal to or more than 10 μm and equal to or less than 50 μm. For example, the thickness of the primary resin layer 14 may be 35 μm, and the thickness of the secondary resin layer 15 may be 25 μm. An outer diameter of the optical fiber 10 may be about equal to or more than 245 μm and equal to or less than 265 μm.

When the outer diameter (D2) of the glass fiber 13 is about 125 μm and the thickness of the coating resin layer 16 is equal to or more than 27 μm and equal to or less than 48 μm, the thickness of each of the primary resin layer 14 and the secondary resin layer 15 may be about equal to or more than 10 μm and equal to or less than 38 μm. For example, the thickness of the primary resin layer 14 may be 25 μm, and the thickness of the secondary resin layer 15 may be 10 μm. An outer diameter of the optical fiber 10 may be about equal to or more than 179 μm and equal to or less than 221 μm.

When the outer diameter (D2) of the glass fiber 13 is about 100 μm and the thickness of the coating resin layer 16 is equal to or more than 22 μm and equal to or less than 37 μm, the thickness of each of the primary resin layer 14 and the secondary resin layer 15 may be about equal to or more than 5 μm and equal to or less than 32 μm. For example, the thickness of the primary resin layer 14 may be 25 μm, and the thickness of the secondary resin layer 15 may be 10 μm. An outer diameter of the optical fiber 10 may be about equal to or more than 144 μm and equal to or less than 174 μm.

The resin composition according to the present embodiment can be applied to the secondary resin layer. The secondary resin layer can be formed by curing the resin composition containing the inorganic oxide particles and the base resin. Accordingly, lateral pressure characteristics of the optical fiber can be improved.

A method for producing an optical fiber according to the present embodiment includes an application step of applying the above-mentioned resin composition onto an outer circumference of the glass fiber composed of the core and the clad; and a curing step of curing the resin composition by irradiation with ultraviolet rays after the application step.

A Young's modulus of the secondary resin layer is preferably equal to or more than 1,300 MPa at 23° C., more preferably equal to or more than 1,300 MPa and equal to or less than 3,600 MPa at 23° C., and even more preferably equal to or more than 1,400 MPa and equal to or less than 3,000 MPa at 23° C. When a Young's modulus of the secondary resin layer is equal to or more than 1,300 MPa, lateral pressure characteristics are easily improved, and when a Young's modulus is equal to or less than 3,600 MPa, appropriate toughness can be imparted to the secondary resin layer, and thereby cracks and the like are less likely to occur in the secondary resin layer.

In some cases, a plurality of optical fibers are arranged in parallel and integrated with a resin for ribbon to form an optical fiber ribbon, but the resin composition of the present disclosure can also be used as a resin for ribbon. Accordingly, lateral pressure characteristics of the optical fiber ribbon can be improved as in the case of the optical fiber, and furthermore, a resin for ribbon having excellent application properties can be obtained.

The inorganic oxide particles dispersed in the dispersion medium are present in a state of being dispersed in the resin layer even after the resin layer is cured. In a case where a reactive dispersion medium is used, the inorganic oxide particles are mixed with the resin composition along with a dispersion medium and incorporated into the resin layer while maintaining the dispersed state. In a case where a non-reactive dispersion medium is used, at least a part of the dispersion medium volatilizes from the resin composition and disappears, but the inorganic oxide particles remain in the resin composition in the dispersed state and are also present in a cured resin layer in the dispersed state. The inorganic oxide particles present in the resin layer are observed in a state in which primary particles are dispersed when observed with an electron microscope. Accordingly, even in a case where a cured resin layer (for example, the secondary resin layer) is analyzed by a small-angle X-ray scattering method, inorganic oxide particles including a plurality of particle groups having different volume average particle sizes are observed as in the case of the resin composition. That is, the optical fiber according to the present embodiment can be said to be an optical fiber including a glass fiber that has a core and a clad; a primary resin layer that is in contact with the glass fiber to coat the glass fiber; and a secondary resin layer that coats the primary resin layer, in which the secondary resin layer contains inorganic oxide particles, the inorganic oxide particles include a plurality of particle groups having different volume average particle sizes, and the volume average particle size is measured by small-angle X-ray scattering.

The primary resin layer 14 can be formed by curing, for example, a resin composition containing a urethane (meth) acrylate oligomer, a monomer, a photopolymerization initiator, and a silane coupling agent. For the resin composition for the primary resin layer, a conventionally known technique can be used. The urethane (meth)acrylate oligomer, the monomer, the photopolymerization initiator, and the silane coupling agent may be appropriately selected from the compounds exemplified for the above-described base resin. However, the resin composition forming the primary resin layer has a composition different from that of the base resin forming the secondary resin layer.

EXAMPLES

Hereinafter, the present disclosure will be described in more detail by showing results of evaluation tests using examples and comparative examples according to the present disclosure. The present disclosure is not limited to these examples.

[Resin Composition for Secondary Resin Layer]
(Oligomer)

As oligomers, a urethane acrylate oligomer (UA) obtained by reacting polypropylene glycol having a molecular weight of 600, 2,4-tolylene diisocyanate, and 2-hydroxyethyl acrylate, and an epoxy acrylate oligomer (EA) were prepared.

(Monomer)

As monomers, isobornyl acrylate (trade name "IBXA" of OSAKA ORGANIC CHEMICAL INDUSTRY LTD.), tripropylene glycol diacrylate (trade name "TPGDA" of DAICEL-ALLNEX LTD.), and 2-phenoxyethyl acrylate (trade name "LIGHT ACRYLATE PO-A" of KYOEISHA CHEMICAL CO., LTD.) were prepared.

(Photopolymerization Initiator)

As photopolymerization initiators, 1-hydroxycyclohexylphenyl ketone and 2,4,6-trimethylbenzoyldiphenylphosphine oxide were prepared.

(Inorganic Oxide Particles)

As inorganic oxide particles, silica sols (MEK dispersion liquid) each containing the following hydrophobic silica particles were prepared.

Silica particles a: particles which have "a particle size equal to or more than 10 nm and equal to or less than 20 nm" and have been treated with a silane coupling agent having a methacrylic group.

Silica particles b: particles which have "a particle size equal to or more than 40 nm and equal to or less than 60 nm" and have been treated with a silane coupling agent having a methacrylic group.

Silica particles c: particles which have "a particle size equal to or more than 80 nm and equal to or less than 130 nm" and have been treated with a silane coupling agent having a methacrylic group.

20 parts by mass of the urethane acrylate oligomer, 20 parts by mass of the epoxy acrylate oligomer, 20 parts by mass of the LIGHT ACRYLATE PO-A, 25 parts by mass of the IBXA, 15 parts by mass of the TPGDA, 1 part by mass of the 1-hydroxycyclohexylphenyl ketone, and 1 part by mass of the 2,4,6-trimethylbenzoyldiphenylphosphine oxide were mixed, and thereby a base resin was prepared.

Next, each of the silica sols was mixed with the base resin such that a content of the silica particles was as shown in Table 1. Thereafter, most of the MEK as a dispersion medium was removed under reduced pressure, and thereby resin compositions of examples and comparative examples (resin composition for a secondary resin layer) were respectively prepared.

capillary having a length of 8 mm and ⌀ 2 mm using a syringe. Next, an opening of the glass capillary was sealed with clay to prepare a sample for resin composition measurement. X-rays were made to be incident perpendicularly to the sample for measurement, and X-rays scattered backward from the sample at a minute angle (small angle) of 5 degrees or less with respect to the incident X-rays were measured with a two-dimensional detector. In the two-dimensional detector, scattering patterns scattered in a 360° direction were acquired.

In addition, the optical fibers obtained in the examples or the comparative examples were arranged without any gaps therebetween so as not to overlap each other, and used for a sample for optical fiber measurement having a size of 1 cm×4 cm. X-rays were made to be incident perpendicularly to the sample for measurement, and X-rays scattered backward from the sample at a minute angle (small angle) of 5 degrees or less with respect to the incident X-rays were

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Total content of silica particles (mass%) | | 40 | 40 | 40 | 40 | 40 | 40 | 40 | 5 |
| Content of silica particles (mass %) | Silica particles a | 8 | 20 | 32 | 8 | — | 4 | — | — |
| | Silica particles b | — | — | — | 32 | 8 | 12 | — | — |
| | Silica particles c | 32 | 20 | 8 | — | 32 | 24 | 40 | 5 |

[Resin Composition for Primary Resin Layer]
(Oligomer)

A urethane acrylate oligomer was prepared by reacting polypropylene glycol having a molecular weight of 2,000, 2,4-tolylene diisocyanate, 2-hydroxyethyl acrylate, and methanol.

(Resin Composition)

75 parts by mass of the urethane acrylate oligomer, 12 parts by mass of nonylphenol EO-modified acrylate, 6 parts by mass of N-vinylcaprolactam, 2 parts by mass of 1,6-hexanediol diacrylate, 1 part by mass of 2,4,6-trimethylbenzoyldiphenylphosphine oxide, and 1 part by mass of γ-mercaptopropyltrimethoxysilane were mixed, and thereby a resin composition for a primary resin layer was prepared.

[Production of Optical Fiber]

The resin composition for a primary resin layer, and the resin composition of the examples or the comparative examples for a secondary resin layer were applied onto an outer circumference of a glass fiber having a diameter of 125 μm and composed of a core and a clad. Thereafter, the resin compositions were cured by irradiating them with ultraviolet rays to form a primary resin layer having a thickness of 35 μm, and form a secondary resin layer having a thickness of 25 μm on an outer circumference of the primary resin layer. Thereby, an optical fiber was produced. A linear speed was 1,500 m/min.

[Various Evaluations]

The following evaluations were carried out using the resin compositions for a secondary resin layer and the optical fibers which were obtained in the examples and comparative examples. The results are shown in Table 2.

(Small-Angle X-Ray Scattering Measurement)

The resin composition obtained in the examples or the comparative examples was injected into a borosilicate glass measured with a two-dimensional detector. In the two-dimensional detector, scattering patterns scattered in a 360° direction were respectively acquired. Because the two-dimensional scattering patterns in 360° contained a component caused by reflection on a side surface of the optical fiber, a component at 40° in which this component was not observed was used for the measurement.

Scattering patterns were acquired by mainly using a beamline "BL8S3" of Aichi Synchrotron Radiation Center for a region in which a particle size of the silica particles was small (approximately less than 50 nm), and by using the beamline "BL8S3" of Aichi Synchrotron Radiation Center and a beamline "BL19B2" of SPring-8 for a region in which a particle size was large (approximately 50 nm or more). Experimental conditions for each of the regions were as follows.

"BL8S3": X-ray energy: 13.5 keV, camera length: 4 in, detector: R-AXIS IV++.

"BL19B2": X-ray energy: 18 keV, camera length: 42 in, detector: PILATUS 2M.

The X-ray scattering intensity profile obtained as described above was analyzed using particle size and pore analysis software "NANO-Solver, Ver. 3.7" (manufactured by Rigaku Corporation). More specifically, fitting was performed by a non-linear least squares method so that the measured X-ray scattering intensity approximated to the value of X-ray scattering intensity calculated by the analysis software. The number of particle groups and a volume average particle size of the inorganic oxide particles were calculated from the fitting results. In the analysis, it was assumed that the inorganic oxide particles were completely spherical. The number of particle groups was obtained by the following procedure. Fitting was performed while assuming that one type of particle group was used, and it was considered that one type of particle group was used when a result in which a normalized dispersion was 60% or less was obtained. In a case where a normalized dispersion was more than 60%, fitting was performed again while assuming that two types of particle group were used, and it was considered that two types of particle group were used when a result in which a normalized dispersion was 60% or less was obtained. In a case where a normalized dispersion was more than 60%, fitting was performed again while assuming that three types of particle group were used, and it was considered that three types of particle group were used when a result in which a normalized dispersion was 60% or less was obtained. Hereinafter, the same procedure was repeated to obtain the number of particle groups.

As a result of the measurement, there was no difference in calculated values of volume average particle sizes of each of the silica particle groups in both a case in which the sample for resin composition measurement was used and a case in which the sample for optical fiber measurement was used.

(Viscosity)

A viscosity of the resin composition at 45° C. was measured using a B-type viscometer ("Digital Viscometer DV-II" manufactured by Brookfield, spindle used: No. 18, rotation speed: 10 rpm).

(Young's Modulus)

A Young's modulus was obtained from a 2.5% secant value by performing a tensile test (distance between marked lines: 25 mm) in an environment of 23±2° C. and 50±10% RH using a pipe-shaped coating resin layer (length: 50 mm or more) obtained by extracting a glass fiber from the optical fiber produced as described above. The Young's modulus thus obtained can be regarded as a substantive Young's modulus of the secondary resin layer.

(Application Properties)

Application properties of the resin composition were evaluated by confirming the presence or absence of breaks in the optical fiber produced as described above. A case in which there were no breaks was evaluated as A, and a case in which breaks were confirmed was evaluated as B.

(Oil Resistance)

The optical fiber produced as described above was immersed in a jelly heated to 85° C. for 60 days such that the entire resin coated layer was completely immersed. Mineral oil (manufactured by Sigma-Aldrich) was used as the jelly. Transmission characteristics at a wavelength of 1,550 nm at 25° C. or −40° C. were measured for the optical fiber after being immersed in the jelly. A time for maintaining the optical fiber at each temperature was 4 hours or longer. Next, a case in which a difference between a transmission loss at 25° C. and a transmission loss at −40° C. was equal to or less than 0.05 dB/km was evaluated as A, and a case in which a difference therebetween was more than 0.05 dB/km was evaluated as B.

TABLE 2

| | | Example 1 | Example 2 | Example 3 | Example 4 | Example 5 | Example 6 | Comparative Example 1 | Comparative Example 2 |
|---|---|---|---|---|---|---|---|---|---|
| Volume average particle size of silica particle groups (nm) | Silica particle group A | 16 | 16 | 16 | 16 | — | 16 | — | — |
| | Silica particle group B | — | — | — | 47 | 47 | 47 | — | — |
| | Silica particle group C | 127 | 127 | 127 | — | 127 | 127 | 127 | 127 |
| Normalized dispersion of silica particle groups (%) | Silica particle group A | 38 | 38 | 38 | 46 | — | 46 | — | — |
| | Silica particle group B | — | — | — | 53 | 53 | 53 | — | — |
| | Silica particle group C | 7 | 7 | 7 | — | 12 | 12 | 7 | 7 |
| Viscosity (45° C) (mPa · s) | | 1800 | 800 | 1200 | 1600 | 1600 | 1600 | 4500 | 300 |
| Young's modulus (MPa) | | 2300 | 2100 | 2000 | 2200 | 2000 | 2500 | 2100 | 1100 |
| Application properties | | A | A | A | A | A | A | B | A |
| Oil resistance | | A | A | A | A | A | A | A | A |

It could be confirmed that in the resin compositions of the examples, excellent lateral pressure characteristics required for a secondary resin layer were realized, and application properties were also excellent.

REFERENCE SIGNS LIST

10 Optical fiber
11 Core
12 Clad
13 Glass fiber
14 Primary resin layer
15 Secondary resin layer
16 Coating resin layer

The invention claimed is:

1. A resin composition for coating an optical fiber, the resin composition comprising:
   a base resin that contains an oligomer, a monomer, and a photopolymerization initiator; and
   inorganic oxide particles,
   wherein the inorganic oxide particles include a plurality of particle groups having different volume average particle sizes,
   the volume average particle size is measured by small-angle X-ray scattering, and
   the inorganic oxide particles are hydrophobic.

2. The resin composition according to claim 1, wherein the inorganic oxide particles are particles containing at least one selected from the group consisting of silicon dioxide, zirconium dioxide, aluminum oxide, magnesium oxide, titanium oxide, tin oxide, and zinc oxide.

3. The resin composition according to claim 1, wherein the inorganic oxide particles include at least two selected from the group consisting of a particle group A in which a volume average particle size is equal to or more than 5 nm and equal to or less than 35 nm, a particle group B in which a volume average particle size is more than 35 nm and equal to or less than 70 nm, and a particle group C in which a volume average particle size is more than 70 nm and equal to or less than 150 nm.

4. A secondary coating material for an optical fiber, the secondary coating material comprising the resin composition according to claim 1.

5. An optical fiber comprising:
a glass fiber that includes a core and a clad;
a primary resin layer that is in contact with the glass fiber to coat the glass fiber; and
a secondary resin layer that coats the primary resin layer,
wherein the secondary resin layer is formed of a cured product of the resin composition according to claim 1.

6. A method for producing an optical fiber, the method comprising:
an application step of applying the resin composition according to claim 1 onto an outer circumference of a glass fiber including a core and a clad; and
a curing step of curing the resin composition by irradiation with ultraviolet rays after the application step.

\* \* \* \* \*